US008713539B2

(12) United States Patent
Bates et al.

(10) Patent No.: US 8,713,539 B2
(45) Date of Patent: *Apr. 29, 2014

(54) MANAGING BREAKPOINTS IN A MULTI-THREADED ENVIRONMENT

(75) Inventors: Cary Lee Bates, Rochester, MN (US); Paul W. Buenger, Eau Claire, WI (US); Steven Gene Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,485

(22) Filed: Jan. 26, 2012

(65) Prior Publication Data
US 2012/0131558 A1    May 24, 2012

Related U.S. Application Data

(63) Continuation of application No. 12/008,213, filed on Jan. 8, 2008, now Pat. No. 8,132,160, which is a continuation of application No. 10/677,001, filed on Sep. 18, 2003, now Pat. No. 7,383,539.

(51) Int. Cl.
*G06F 9/44*   (2006.01)

(52) U.S. Cl.
USPC .................... 717/129; 717/128; 717/140

(58) Field of Classification Search
USPC .................... 717/124–133, 140–141
See application file for complete search history.

(56) References Cited

U.S. PATENT DOCUMENTS

| 5,093,914 | A | 3/1992 | Coplien et al. |
| 5,179,702 | A | 1/1993 | Spix et al. |
| 5,652,909 | A | 7/1997 | Kodosky |
| 5,764,989 | A | 6/1998 | Gustafsson et al. |
| 5,778,230 | A | 7/1998 | Wimble et al. |
| 5,819,093 | A | 10/1998 | Davidson et al. |
| 5,933,639 | A | 8/1999 | Meier et al. |
| 6,058,393 | A | 5/2000 | Meier et al. |
| 6,158,045 | A | 12/2000 | You |
| 6,226,787 | B1 | 5/2001 | Serra et al. |
| 6,263,489 | B1 | 7/2001 | Olsen et al. |
| 6,295,613 | B1 | 9/2001 | Bates et al. |
| 6,378,125 | B1 | 4/2002 | Bates et al. |
| 6,477,702 | B1 | 11/2002 | Yellin et al. |
| 6,493,868 | B1 | 12/2002 | DaSilva et al. |
| 6,654,949 | B1 * | 11/2003 | Fraenkel et al. ............ 717/130 |

(Continued)

OTHER PUBLICATIONS

Kessler, "Fast Breakpoints: Design and Implementation", ACM 390-397, 2003.*

(Continued)

*Primary Examiner* — Anil Khati
(74) *Attorney, Agent, or Firm* — Owen J. Gamon; Grant A. Johnson

(57) ABSTRACT

An electronic device is provided that, in an embodiment, saves a plurality of values for a variable specified by a condition after a respective plurality of encounters of a breakpoint by a program that modifies the variable. One of the plurality of values is selected based on a condition. A determination is made whether to stop execution of the program at the breakpoint based on the one of the plurality of the values. Execution of the program is stopped at the breakpoint if the determining is true. The program is allowed to continue to execute if the determining is false.

20 Claims, 8 Drawing Sheets

(56) References Cited

U.S. PATENT DOCUMENTS

| | | | |
|---|---|---|---|
| 6,681,384 B1 | 1/2004 | Bates et al. | |
| 6,721,941 B1 | 4/2004 | Morshed et al. | |
| 6,751,583 B1 | 6/2004 | Clarke et al. | |
| 6,817,010 B2 | 11/2004 | Aizenbud-Reshef et al. | |
| 6,836,882 B2 * | 12/2004 | Swoboda | 717/134 |
| 6,895,577 B1 | 5/2005 | Noble et al. | |
| 6,931,631 B2 * | 8/2005 | Bates et al. | 717/129 |
| 6,988,264 B2 | 1/2006 | Sarma et al. | |
| 7,020,871 B2 * | 3/2006 | Bernstein et al. | 717/129 |
| 7,080,360 B2 * | 7/2006 | Bates et al. | 717/129 |
| 7,107,578 B1 | 9/2006 | Alpern | |
| 7,133,820 B2 | 11/2006 | Pennello et al. | |
| 7,178,135 B2 * | 2/2007 | Bates et al. | 717/129 |
| 7,178,136 B2 | 2/2007 | Morgan | |
| 7,293,259 B1 * | 11/2007 | Dmitriev | 717/130 |
| 7,386,839 B1 * | 6/2008 | Golender et al. | 717/129 |
| 7,774,757 B1 * | 8/2010 | Awasthi et al. | 717/127 |
| 8,132,160 B2 * | 3/2012 | Bates et al. | 717/129 |
| 8,156,476 B2 * | 4/2012 | Maybee et al. | 717/124 |
| 8,286,142 B2 * | 10/2012 | Fjeldstad et al. | 717/129 |
| 8,312,434 B2 * | 11/2012 | Bates et al. | 717/128 |
| 8,327,336 B2 * | 12/2012 | Bates et al. | 717/128 |
| 8,458,665 B2 * | 6/2013 | Bates et al. | 717/124 |
| 8,522,209 B2 * | 8/2013 | Wintergerst et al. | 717/124 |

OTHER PUBLICATIONS

Jiang et al, "Scaffold Filling under the Breakpoint and Related Distances", IEEE/ACM Transactions on Computational Biology and Bioinformatics, vol. 9, No. 4, pp. 1220-1229, Jul./Aug. 2012.*

Zhang et al, "BPGen: An Automated Breakpoint Generator for Debugging", ACM, pp. 271-274, 2010.*

Chem et al., Debugging with control flow breakpoints, ACM AOSD, 2007, pp. 96-106.

Koch et al., Breakpoints and Breakpoint detection in source level emulation, IEEE ISSS, 1996, pp. 26-31.

Iqbal et al., Understanding and developing modules for detecting and differentiating breakpoints during interactive tasks, ACM CHI, 2007, pp. 697-706.

Wahbe et al., Practical data breakpoints: design and implementations, ACM SIGPLAN PLDI, 1993, pp. 1-12.

* cited by examiner

MANAGING BREAKPOINTS IN A MULTI-THREADED ENVIRONMENT

CROSS REFERENCE TO RELATED APPLICATION

This is a continuation application of U.S. patent application Ser. No. 12/008,213, filed Jan. 8, 2008 to Cary L. Bates, et al., entitled "MANAGING BREAKPOINTS IN A MULTI-THREADED ENVIRONMENT," which is a continuation application of U.S. patent application Ser. No. 10/667,001, filed Sep. 18, 2003, to Cary L. Bates, et al., entitled "MANAGING BREAKPOINTS IN A MULTI-THREADED ENVIRONMENT," which is herein incorporated by reference.

FIELD

This invention generally relates to computer programming and more specifically relates to managing breakpoints, breakpoint groups, conditional breakpoints, and breakpoints in a multi-threaded environment.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until a breakpoint is reached. The debugger then stops execution of the program and displays the results of the program to the programmer for analysis.

Typically, step operations and breakpoints are used together to simplify the debugging process. Specifically, a common debugging operation is to set a breakpoint at the beginning of a desired set of instructions to be analyzed and then begin executing the program. Once the breakpoint is reached, the debugger halts the program, and the programmer then steps through the desired set of instructions line-by-line using the step operation. Consequently, a programmer is able to more quickly isolate and analyze a particular set of instructions without needing to step through irrelevant portions of a computer program.

Thus, once the programmer determines the appropriate places in the program and sets breakpoints at those appropriate places, the breakpoints can be a powerful tool. But, many breakpoints may be needed, and the breakpoints needed may change over time as the programmer gains more information about the problem being debugged. Hence, determining the appropriate places in the program, setting breakpoints at those places, and removing the breakpoints that are no longer needed can be an arduous task.

To make setting and removing breakpoints easier, some conventional debuggers have breakpoint groups. The primary use of these groups is to form a collection of breakpoints, which can be enabled and disabled all at once. Breakpoint groups allow the programmer to more rapidly adjust the debug environment and not be burdened by excessive and undesired breakpoint hits. While breakpoint groups can be a real time saver once they are set up, in situations as dynamic as debugging, programmers often experience difficulty in managing the group of breakpoints.

The difficulty in managing breakpoints is exacerbated when the program being debugged executes in multiple jobs. A job is a single process or task that is performed by the computer. Each job consists of allocated memory known as working storage and one or more execution states known as threads, which follow the control flow of program code saved in working storage. Jobs have unique designators associated with them for the purpose of identifying a particular job. A user who desires to perform a specific computer operation designates the execution path corresponding to the operation, and the computer accordingly creates the associated job. A computer processor in turn executes the created job, and the user's desired operation is initiated. A computer processor cycles through a sequence of jobs, generally servicing in some capacity each job. Multiple job environments can significantly complicate the debugging process, particularly when certain jobs are not amendable to debugging directly.

Some conventional debuggers support conditional breakpoints, which allow the user to set a breakpoint that fires only if a program variable achieves a certain value. For example, consider a standard "for loop" that increments the variable "i" once during each loop iteration. Conditional breakpoints allow the user to set a breakpoint that fires when the current value of "i" is greater than or equal to 10. While conditional breakpoints can be useful, they are limited to the current state of program variables.

Without a better way to manage breakpoints, conditional breakpoints, breakpoints in the threads of jobs, and breakpoint groups, the debugging of programs will continue to be a difficult and time-consuming task, which delays the introduction of software products and increases their costs.

SUMMARY

An electronic device is provided that, in an embodiment, saves a plurality of values for a variable specified by a condition after a respective plurality of encounters of a breakpoint by a program that modifies the variable. One of the plurality of values is selected based on a condition. A determination is made whether to stop execution of the program at the breakpoint based on the one of the plurality of the values. Execution of the program is stopped at the breakpoint if the determining is true. The program is allowed to continue to execute if the determining is false.

DETAILED DESCRIPTION

In an embodiment, a debug controller saves values of a variable that is specified by a condition when a program that modifies the variable encounters the breakpoint. The debug controller uses the previous values of the variable to determine whether to stop execution of the program at the breakpoint based on one of the saved values, as specified by the condition. In another embodiment, the debug controller applies an attribute to all breakpoints in a breakpoint group. The attribute includes data that the debug controller uses to decide whether to halt the program upon encountering the breakpoints or allow the program to continue to execute. Examples of attributes include a breakpoint style, thread specificity of the breakpoint, and a breakpoint condition. In another embodiment, the debug controller presents a user interface that allows the specification of exclusion and inclusion of the breakpoint on a thread basis. When the program encounters a breakpoint, the debug controller determines whether to halt the breakpoint based on the thread in which the program executes using the specification.

Figure 1:
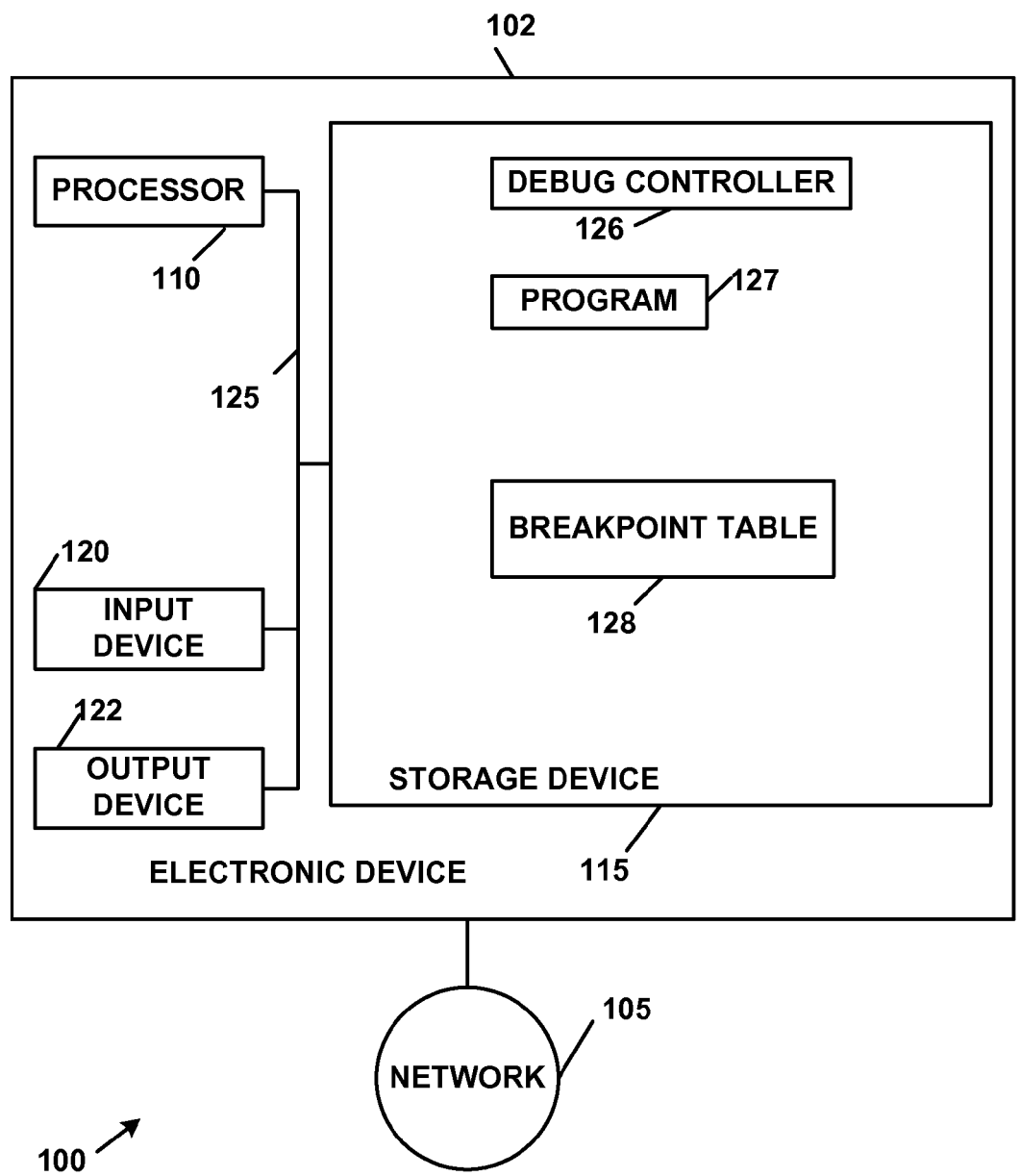
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, it may be distributed across other electronic devices, such as devices connected to the network 105.

The storage device 115 includes a debug controller 126, a program 127, and a breakpoint table 128, all of which may in various embodiments have any number of instances. The debug controller 126 creates the breakpoint table 128 to represent breakpoints and breakpoint groups within the program 127 in order to debug the program 127. In an embodiment, the debug controller 126 includes instructions capable of executing on the processor 110 or statements capable of being interpreted by instructions executing on the processor 110 to display the user interfaces as further described below with reference to FIGS. 4 and 7, to carry out the functions as further described below with reference to FIGS. 3, 5, 6, and 8, and to manipulate the breakpoint table 128 as further described below with reference to FIG. 2. In another embodiment, the debug controller 126 may be implemented in hardware via logic gates and/or other appropriate hardware techniques.

The program 127 includes instructions capable of executing on the processor 110 or statements capable of being interpreted by instructions executing on the processor 110. The program 127 is to be debugged using the debug controller 126.

Although the debug controller 126, the program 127, and the breakpoint table 128 are illustrated as being contained within the storage device 115 in the electronic device 102, in other embodiments some or all of them may be on different electronic devices and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of FIGS. 4 and 7, as further described below.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces of FIGS. 4 and 7, as further described below.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
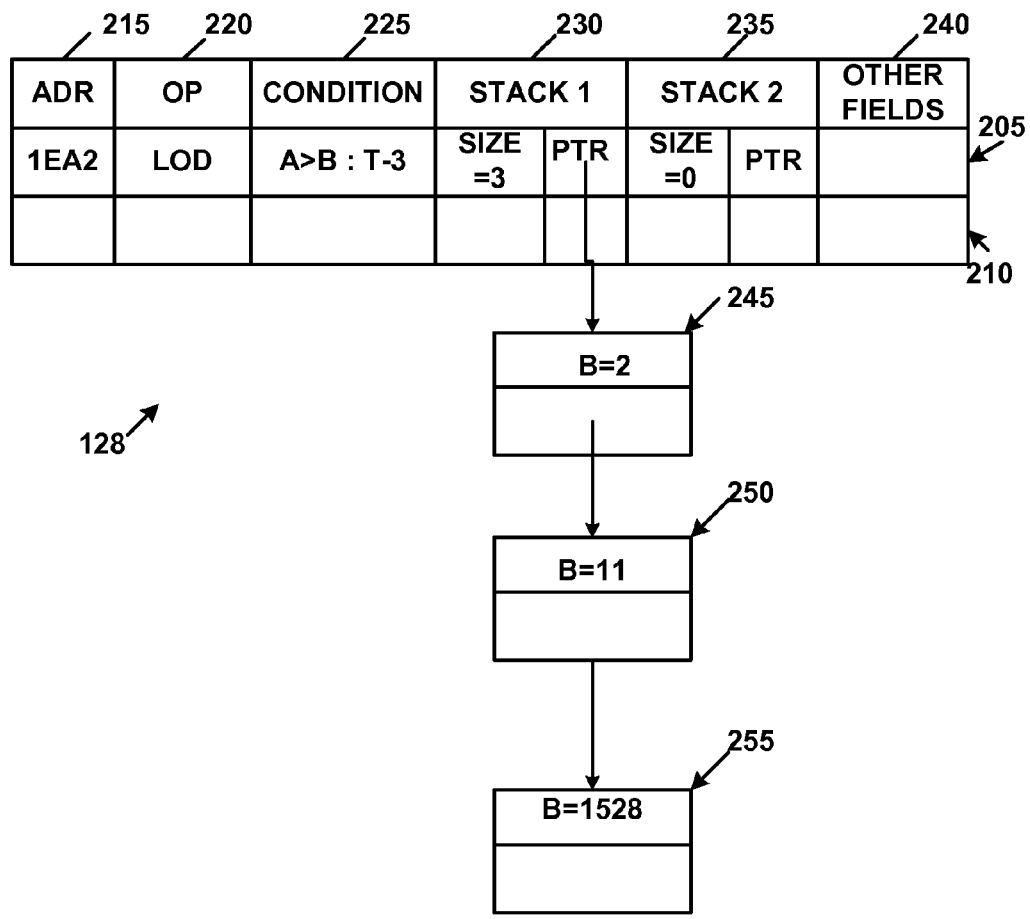
FIG. 2 depicts a block diagram of an example breakpoint table data structure, according to an embodiment of the invention.

FIG. 2 depicts a block diagram of an example breakpoint table data structure 128, according to an embodiment of the invention. The breakpoint table 128 includes records, such as records 205 and 210, but in other embodiments any number of records with any appropriate data may be included. The records represents breakpoints within the program 127. Each record includes an address field 215, an operation code field 220, a condition field 225, one or more stacks, such as stack 230 and stack 235, and other fields 240. In various embodiments, some of the fields in the records may be optional or not used and additional fields may also be present.

The address field 215 indicates the address, line number, or location within the program 127 where a breakpoint is set. In various embodiments, the address 215 may be an absolute or a relative address. The operation code 220 indicates the instruction, statement, or operation that is stored at the address 215 in the program 127.

The condition field 225 indicates a condition that the debug controller 126 evaluates after the program 127 encounters the breakpoint associated with the record. The debug controller 126 evaluates the condition 225 to determine whether or not to halt execution of the program 127 at the breakpoint, as further described below with reference to FIG. 3. The example condition shown is "A>B:T-3," which means: "if the current value of A is greater than the previous value of B at time T-3." Every time the program 127 encounters or hits the breakpoint, the debug controller 126 stores the value of the variable or variables in the condition 225 into the stack 230 as a new stack entry. In an embodiment, the variables in the condition 225 are variables modified by the program 127, but in other embodiments the condition 225 may include any appropriate condition capable of being checked or determined. In the example shown, three stack entries are present: stack entry 245 corresponding to time T-1, stack entry 250 corresponding to time T-2, and stack entry 255 corresponding to time T-3. Thus, the current time is represented as T. The previous time the program 127 hit the breakpoint is represented as T-1. The next most-previous time the program 127 hit the breakpoint is represented as T-2, and so on. Thus, in the example shown, the first time the program 127 hit the breakpoint, B was 1528 (at time T-3); the second time the program 127 hit the breakpoint, B was 11 (at time T-2); and the third time the program 127 hit the breakpoint, B was 2 (at time T-1). The breakpoint table 128 may include multiple stacks (such as the additional stack 235) to save previous values of multiple conditions or multiple variables, either multiple conditions within the condition field 225 or multiple condition fields.

The other fields 240 may include other optional information regarding the breakpoint, such as the breakpoint group to which the breakpoint belongs, the breakpoint style, and a thread of the program 127 associated with the breakpoint. But, in other embodiments, any appropriate information may be included in the other fields 240.

Figure 3:
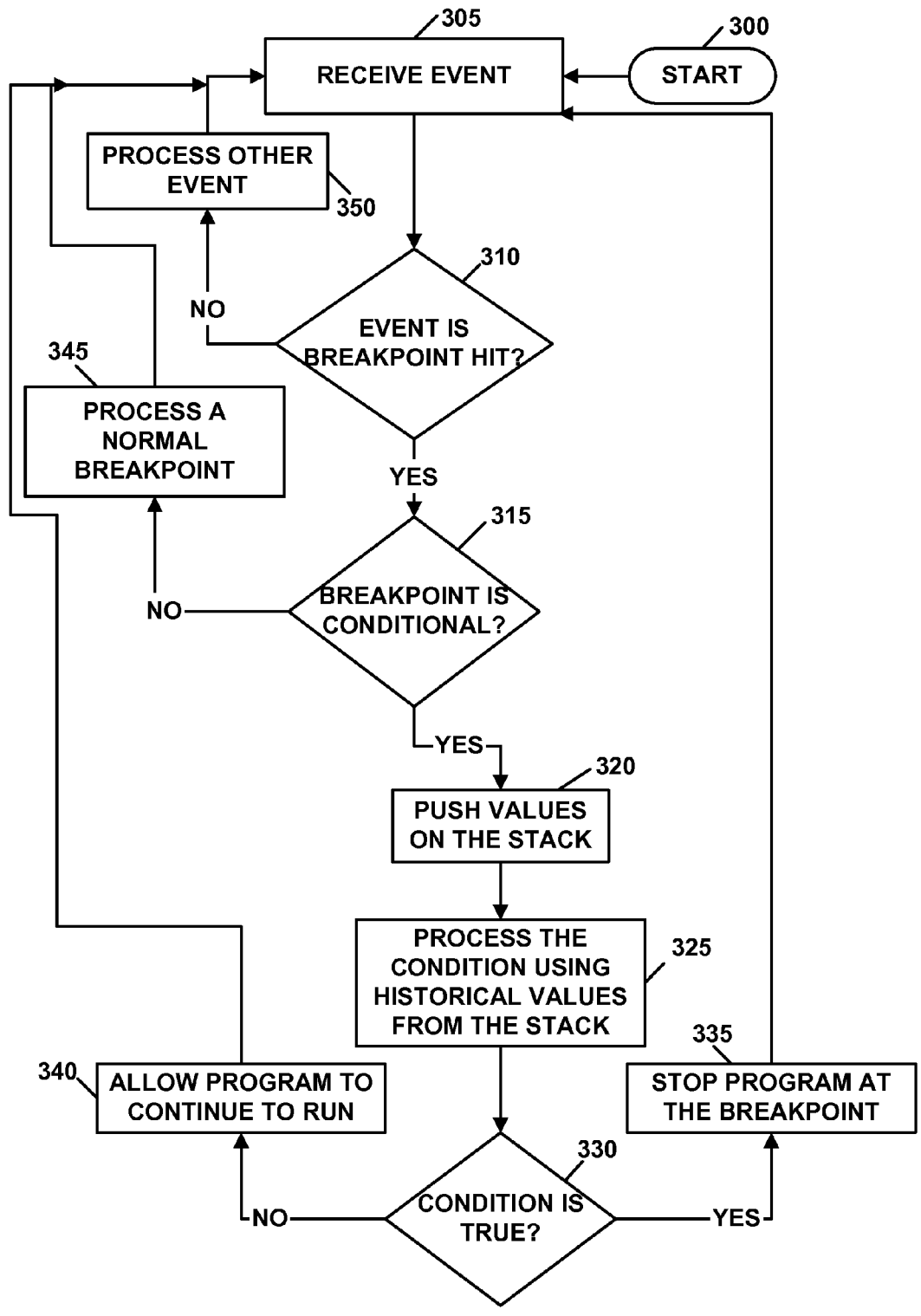
FIG. 3 depicts a flowchart of example processing for conditional breakpoints, according to an embodiment of the invention.

FIG. 3 depicts a flowchart of example processing for conditional breakpoints, according to an embodiment of the invention. Control begins at block 300. Control then continues to block 305 where the debug controller 126 receives an event. In various embodiments, an event may be a message, an interrupt, an invocation, or any other appropriate notifying event.

Control then continues to block 310 where the debug controller 126 determines whether the event received is a breakpoint hit event. If the determination at block 310 is true, then the event received at block 305 indicates that the program 127 hit or encountered a breakpoint while executing, so control continues to block 315 where the debug controller 126 determines whether the breakpoint hit is a conditional breakpoint by determining whether the condition field 225 in the breakpoint table 128 is present and includes a condition.

If the determination at block 315 is true, then the breakpoint that the program 127 hit is a conditional breakpoint, so control continues to block 320 where the debug controller 126 pushes the current values of the variable or variables indicated in the condition 225 onto the stack, such as the stack 230 or the stack 235. In this way, the debug controller 126 selects the variable and its value to save based on the condition 225 associated with the breakpoint. Using the example of FIG. 2, the debug controller 126 pushes the current value of B to the stack 230 as a new entry on the stack 230. In this way, the debug controller 126 saves values of variables after encounters of the breakpoint by the program 127. Control then continues to block 325 where the debug controller 126 processes the condition indicated in the condition field 225 using the historical values from the stack. Using the example of FIG. 2, the debug controller 126 finds the entry on the stack 230 associated with time T-3 since time T-3 is specified in the condition 225. The value at B time at T-3, shown in the entry 255 is "1528."

Control then continues to block 330 where the debug controller 126 determines whether the condition is true. In the example of FIG. 2, the debug controller 126 determines whether the current value of A is greater than the value of B at time T-3, which was 1528.

If the determination at block 330 is true, then control continues to block 335 where the debug controller 126 stops the program 127 at the breakpoint since the condition was satisfied. In this way, the debug controller 126 stops execution of the program 127 at a breakpoint based on a previous value of a variable. Control then returns to block 305 as previously described above.

If the determination at block 330 is false, then control continues to block 340 where the debug controller 126 allows the program 127 to continue to run since the condition was not satisfied. Control then returns to block 305, as previously described above.

If the determination at block 315 is false, then control continues to block 345 where the debug controller 126 processes a normal breakpoint. Control then returns to block 305 as previously described above.

If the determination at block 310 is false, then the event received at block 305 is not a breakpoint hit event, so control continues to block 350 where the debug controller 126 processes the received event. Control then returns to block 305 as previously described above.

Figure 4:
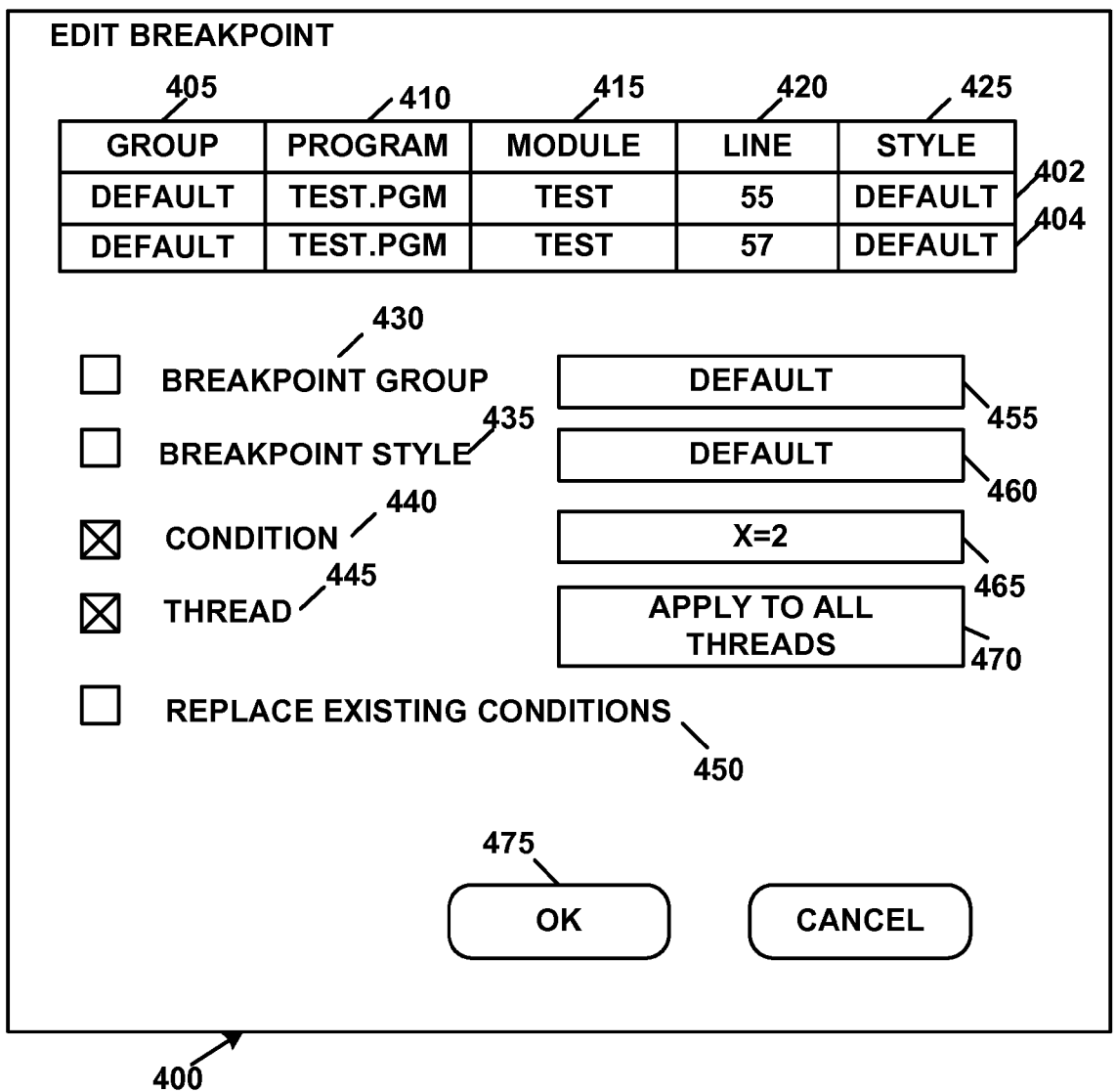
FIG. 4 depicts a pictorial representation of an example user interface for managing breakpoint groups, according to an embodiment of the invention.

FIG. 4 depicts a pictorial representation of an example user interface 400 for requesting changes or edits to attributes for breakpoint groups and requesting that the changes to the attributes be reflected in all breakpoints in the group, according to an embodiment of the invention. An attribute is control information associated with a breakpoint that impacts whether the debug controller 126 halts the execution of the program 127 or allows the program 127 to continue to execute when the program 127 encounters the breakpoint. The debug controller 126 presents the example user interface 400 via the output device 122. The data shown in FIG. 4 is exemplary only, and any appropriate data may be used.

The user interface 400 includes a display of breakpoint records 402 and 404, each having a group field 405, a program field 410, a module field 415, a line field 420, and style field 425. The group field 405 indicates the group to which the breakpoint belongs. The program field 410 identifies the program 127 where the breakpoint is set. The module field 415 identifies the module, function, procedure, or method within the program 127 where the breakpoint is set. The line field 420 identifies the address, line, or location (relative or absolute) within the module 415 and the program 410 where the breakpoint is set.

The style field 425 indicates the style of the breakpoint. An example of a breakpoint style is a global breakpoint, which causes any active job that executes the program 127 to stop when the breakpoint is encountered by that job. Another example of a breakpoint style is local breakpoint that only causes the program 127 to stop when the breakpoint is encountered by a job that is under debug. Another example of a breakpoint style is a service entry break point, which causes a job to stop if the job is not under debug, it has an attribute common to another job that established the breakpoint, and the other job is waiting to begin servicing a job having the same attribute.

The user interface 400 further includes a breakpoint group request field 430, a breakpoint style request field 435, a condition request field 440, a thread request field 445, and a replace existing conditions request field 450. The user interface further includes a breakpoint group specification field 455, which allows the user to enter a breakpoint group name, a breakpoint style specification field 460, which allows the user to enter a name of a breakpoint style, a condition specification field 465, which allows the user to enter a condition, and a thread specification field 470, which allows the user to specifies how threads are to be handled.

If the user selects the breakpoint group 430 and enters a name into the breakpoint group specification field 455, then the debug controller 126 applies all the attributes specified in the user interface 400 to all breakpoints in the specified group after the user selects OK 475, as further described below with reference to FIGS. 5 and 6. If the user selects the breakpoint style 435 and enters a style into the breakpoint style specification field 460, then the debug controller 126 applies the style to all breakpoints in the specified breakpoint group, as further described below with reference to FIGS. 5 and 6. If the user selects the condition 440 and specifies a condition in the condition specification field 465, then the debug controller 126 applies the condition to all breakpoints in the specified breakpoint group, as further described below with reference to FIGS. 5 and 6. If the user specifies the thread 445 and enters a thread specification into the thread specification field 470, then the debug controller 126 applies the entered thread specification attribute to all breakpoints in the specified breakpoint group, as further described below with reference to FIGS. 5 and 6. If the user specifies the replace existing conditions 450, then the debug controller 126 replaces any existing condition with the new condition 465. If the user does not specify the replace existing conditions 450, then the debug controller 126 joins the new condition 465 with any existing conditions.

Figure 5:
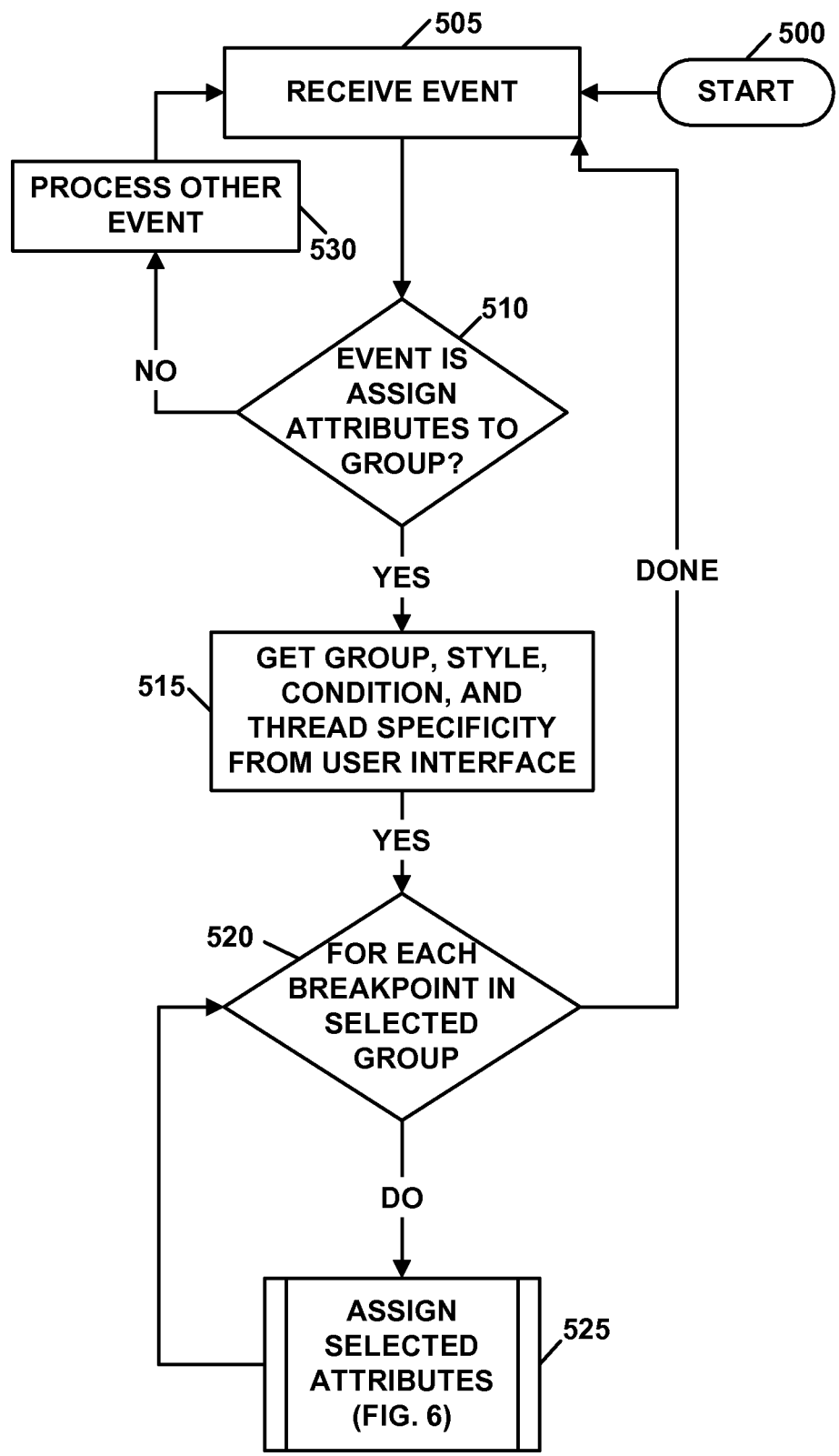
FIG. 5 depicts a flowchart of example processing for assigning attributes to all breakpoints within a breakpoint group, according to an embodiment of the invention.

FIG. 5 depicts a flowchart of example processing for assigning attributes to all breakpoints within a breakpoint group, according to an embodiment of the invention. Control begins at block 500. Control then continues to block 505 where the debug controller 126 receives an event. Control then continues to block 510 where the debug controller 126 determines whether the received event is an assign attributes to a group event, which in an embodiment is initiated by the OK button 475 on the user interface 400 (FIG. 4).

If the determination at block 510 is true, then control continues to block 515 where the debug controller 126 retrieves some or all of the breakpoint group 455, the breakpoint style 460, the breakpoint condition 465, and the breakpoint thread specificity 470 from the user interface 400, depending on whether the user selected the breakpoint group 430, the breakpoint style 435, the condition 440, and/or the thread 445.

Control then continues to block 520 where the debug controller 126 enters a loop to process each breakpoint in the selected group. If a breakpoint remains to be processed, then control continues from block 520 to block 525 where the debug controller 126 assigns the selected attributes to the current breakpoint, as further described below with reference to FIG. 6. Control then returns to block 520, as previously described above.

When all breakpoints have been processed in the loop of blocks 520 and 525, then control returns from block 520 to block 505, as previously described above.

If the determination at block 510 is false, then control continues to block 530 where the debug controller 126 processes the received event. Control then returns to block 505, as previously described above.

Figure 6:
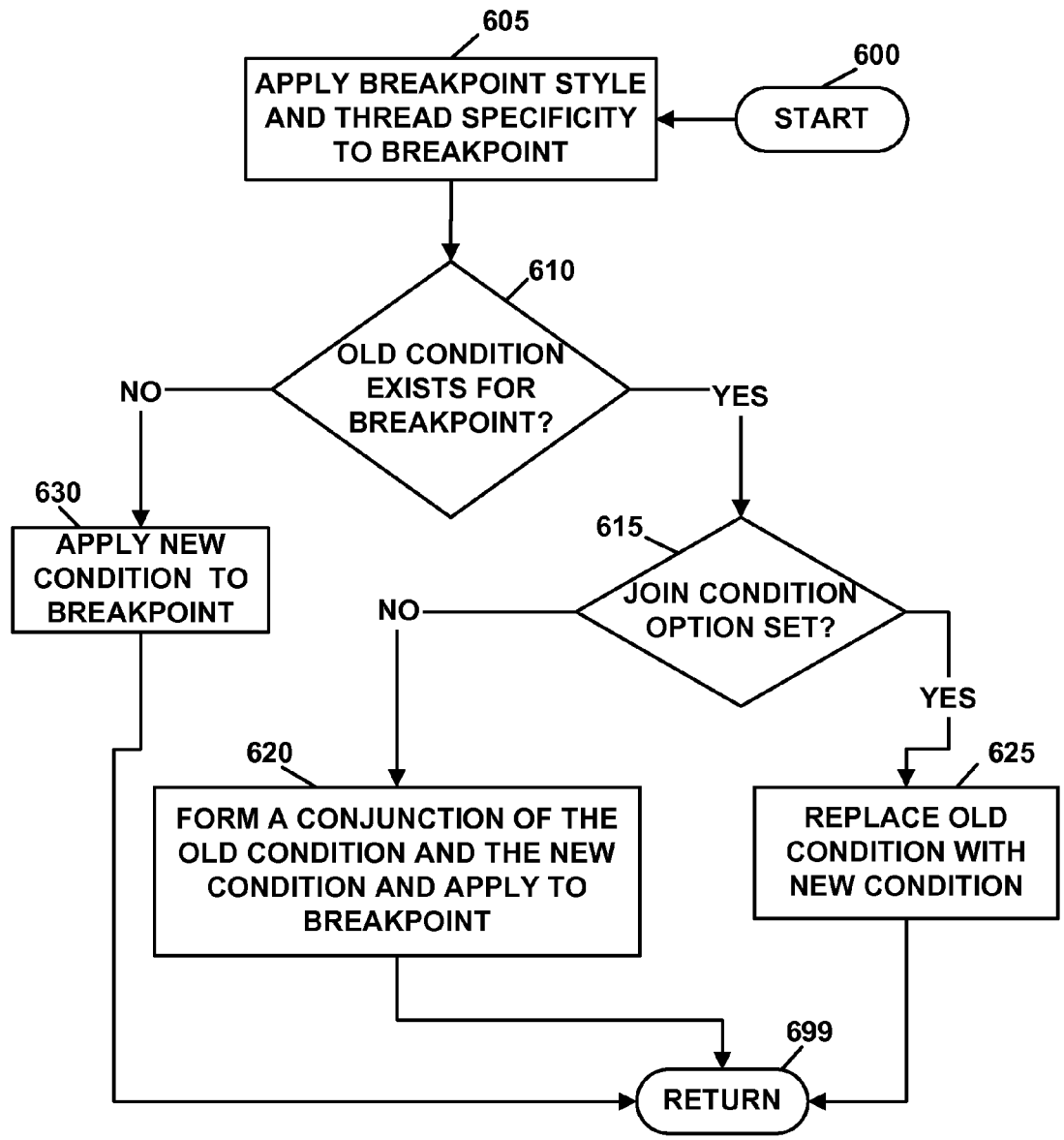
FIG. 6 depicts a flowchart of example processing for assigning attributes to a breakpoint, according to an embodiment of the invention.

FIG. 6 depicts a flowchart of example processing for assigning attributes to a breakpoint, according to an embodiment of the invention. Control begins at block 600. Control then continues to block 605 where the debug controller 126 optionally applies the breakpoint style and thread specificity to the breakpoint by adding the style 460 and/or the thread specificity 470 to the appropriate field in the other fields 240 (FIG. 2) in the record in the breakpoint table 128 associated with the current breakpoint in the breakpoint group 455. Control then continues to block 610 where the debug controller 126 determines whether an old condition already exists in the condition 225 for the current breakpoint.

If the determination at block 610 is true, then control continues to block 615 where the debug controller 126 determines whether the join option is set (whether the replace existing conditions 450 was not set). If the determination at block 615 is true, then control continues to block 625 where the debug controller 126 replaces the old condition in the condition 225 with the new condition specified in the condition 465. Control then continues to block 699 where the function returns.

If the determination at block 615 is false, then control continues to block 620 where the debug controller 126 forms a conjunction of the old condition (pre-existing in the condition 225) and the new condition (specified in the condition 465) and applies the result to the condition field 225 in the record in the breakpoint table 128 associated with the current breakpoint. Control then continues to block 699 where the function returns.

If the determination at block 610 is false, then control continues to block 630 where the debug controller 126 applies the new condition (specified in the condition 465) to the condition field 225 in the record in the breakpoint table 128 associated with the current breakpoint. Control then continues to block 699 where the function returns.

Figure 7:
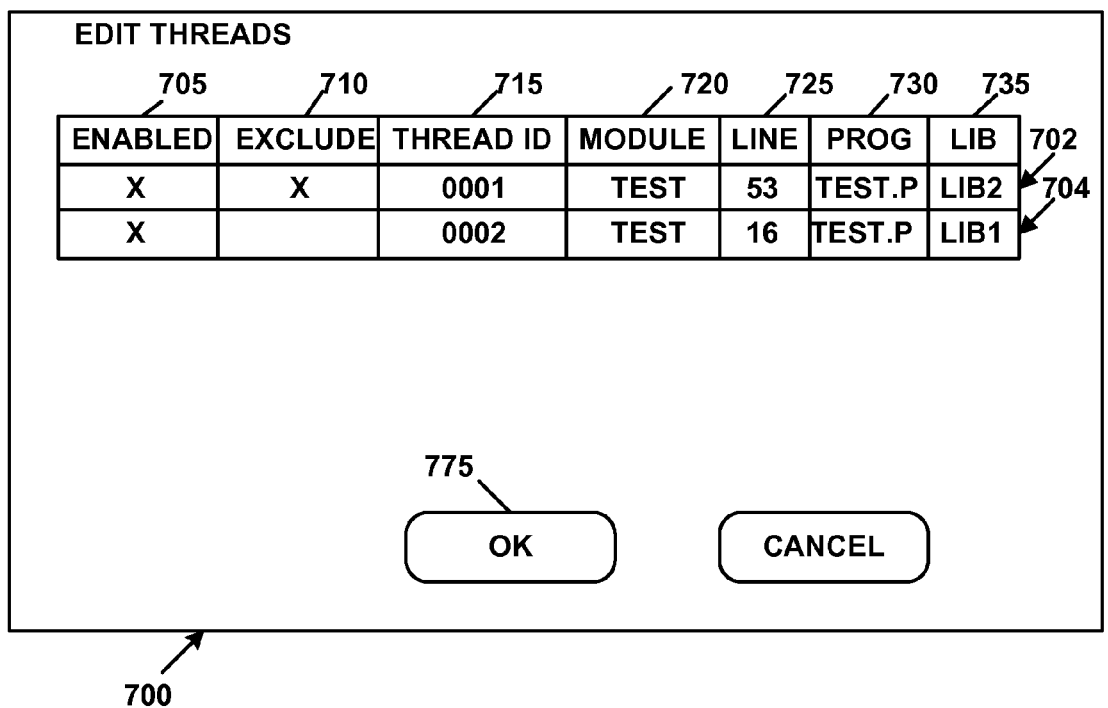
FIG. 7 depicts a pictorial representation of an example user interface for requesting processing for breakpoints within a thread, according to an embodiment of the invention.

FIG. 7 depicts a pictorial representation of an example user interface 700 for requesting processing for breakpoints within a thread, according to an embodiment of the invention. The debug controller 126 presents the example user interface 700 via the output device 122. The data shown in FIG. 7 is exemplary only, and any appropriate data may be used.

The user interface 700 includes records 702 and 704 representing breakpoints within threads. In other embodiments any number of records may be present. Each record includes an enabled field 705, an exclude field 710, a thread identifier field 715, a module field 720, a line field 725, a program field 730, and a library field 735, but in other embodiments more or fewer fields may be present.

The enabled field 705 indicates whether the breakpoint associated with the record is enabled or disabled. The exclude field 710 indicates whether the debug controller 126 is to exclude or include the associated breakpoint when the thread identified by the thread identifier 715 encounters or hits the associated breakpoint, as further described below with reference to FIG. 8. The module 720 identifies the module within the program 127 where the breakpoint is set. The line 725 identifies the line, instruction number, or location (relative or absolute) within the module where the breakpoint is set. The program field 730 identifies the program 127 that contains the module. The library 735 identifies the library where the program 127 is located. The user may modify the settings of the enabled field 705 and the exclude field 710 and then request via the OK button 775 that the debug controller 126 enabled and disable breakpoints and exclude or include breakpoints from the associated thread.

Figure 8:
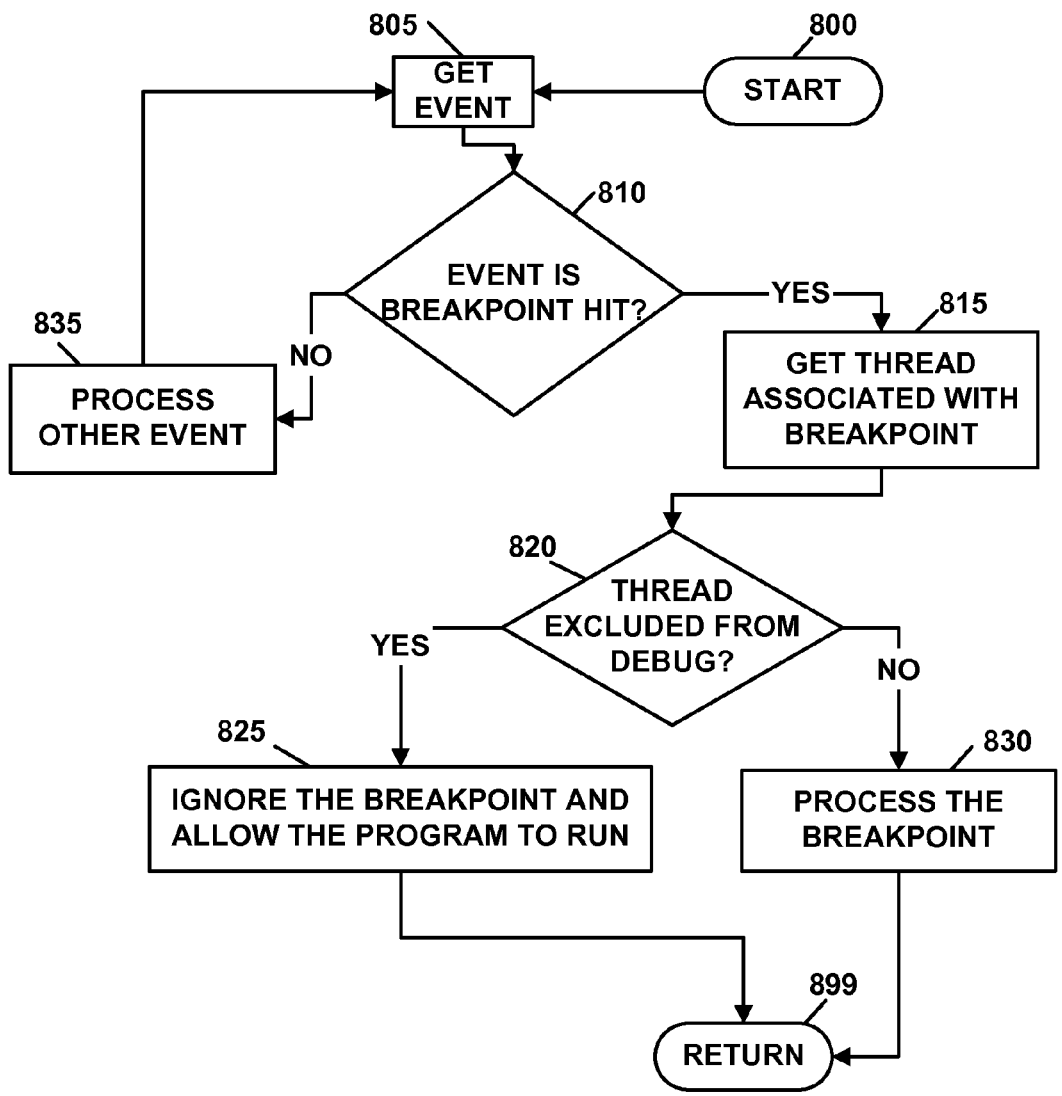
FIG. 8 depicts a flowchart of example processing for breakpoints within a thread, according to an embodiment of the invention.

FIG. 8 depicts a flowchart of example processing for breakpoints within a thread of the program 127, according to an embodiment of the invention. Control begins at block 800. Control then continues to block 805 where the debug controller 126 receives an event. Control then continues to block 810 where the debug controller 126 determines whether the event received at block 805 indicates that the program 127 hit a breakpoint.

If the determination at block 810 is true, then control continues to block 815 where the debug controller 126 finds the thread of the program 127 associated with the hit breakpoint. Control then continues to block 820 where the debug controller determines whether the thread retrieved at block 815 is to be excluded from debug, which may be requested by the user via the exclude field 710 (FIG. 7).

If the determination at block 820 is true, then control continues to block 825 where the debug controller 126 ignores the breakpoint and allows the program 127 to continue to run. Control then continues to block 899 where the function returns.

If the determination at block 820 is false, then control continues to block 830 where the debug controller 126 processes the hit breakpoint and stops the execution of the program 127. Control then continues to block 899 where the function returns.

If the determination at block 810 is false, then control continues to block 835 where the debug controller 126 processes another event. Control then returns to block 805, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. An electronic device comprising:
    a processor; and
    a non-transitory storage device connected to the processor, wherein the storage device is encoded with instructions, and wherein the instructions when executed on the processor comprise:
        saving a plurality of values for a variable specified by a condition after a respective plurality of encounters of a breakpoint by a program that modifies the variable,
        selecting one of the plurality of values based on a condition,
        determining whether to stop execution of the program at the breakpoint based on the one of the plurality of the values,
        stopping execution of the program at the breakpoint if the determining is true, and
        allowing the program to continue to execute if the determining is false.

2. The electronic device of claim 1, wherein the selecting further comprises:
    finding the one of the plurality of values that is associated with a time that the breakpoint was encountered, wherein the condition specifies the time.

3. The electronic device of claim 2, wherein the determining further comprises:
    determining whether the condition is true using the one of the plurality of values for the variable at the time specified by the condition.

4. The electronic device of claim 1, wherein the instructions further comprise:
    selecting the variable based on the condition.

5. The electronic device of claim 1, wherein the saving further comprises:
    pushing the plurality of values onto a stack associated with the breakpoint and the variable.

6. The electronic device of claim 5, wherein the determining further comprises:
    finding the one of the plurality of values in the stack; and
    processing the condition using the one of the plurality of values.

7. The electronic device of claim 1, wherein the determining further comprises:
    evaluating the condition.

8. An electronic device comprising:
    a processor; and
    a non-transitory storage device connected to the processor, wherein the storage device is encoded with instructions, and wherein the instructions when executed on the processor comprise:
        determining whether a plurality of old conditions exist for a plurality of respective breakpoints in a breakpoint group,
        applying a new condition to each of the plurality of breakpoints if the each of the plurality of old conditions exits,
        saving a plurality of values for a variable specified by the new condition after a respective plurality of encounters of one of the plurality of breakpoints by a program that modifies the variable,
        selecting one of the plurality of values based on the new condition,
        determining whether to stop execution of the program at the one of the plurality of breakpoints based on the one of the plurality of the values,
        if the determining is true, stopping execution of the program at the one of the plurality of breakpoints, and
        if the determining is false, allowing the program to continue to execute.

9. The electronic device of claim 8, wherein the applying further comprises:
    forming a conjunction of the new condition and each of the plurality of old conditions if the each of the plurality of old conditions exists and a join option is selected.

10. The electronic device of claim 8, wherein the applying further comprises:
    replacing each of the plurality of old conditions with the new condition if the each of the plurality of old conditions exists and a replace option is selected.

11. The electronic device of claim 8, wherein the instructions further comprise:
    applying an attribute to all of the plurality of breakpoints in the breakpoint group.

12. The electronic device of claim 11, wherein the attribute is a breakpoint style.

13. The electronic device of claim 11, wherein the attribute is thread specificity of the plurality of breakpoints in the breakpoint group.

14. The electronic device of claim 11, wherein the determining further comprises:

determining whether to stop execution of the program at the one of the plurality of breakpoints based on the attribute.

15. The electronic device of claim 11, wherein the instructions further comprise:
presenting a user interface that allows specification of exclusion and inclusion of the plurality of breakpoints on a thread basis.

16. An electronic device comprising:
a processor; and
a non-transitory storage device connected to the processor, wherein the storage device is encoded with instructions, wherein the instructions when executed by the processor comprise:
saving a plurality of values for a variable specified by a condition after a respective plurality of encounters of a breakpoint by a program that modifies the variable,
selecting one of the plurality of values based on the condition,
deciding whether to allow the program to continue executing at the breakpoint based on the one of the plurality of the values and based on a thread of the program associated with the breakpoint,
stopping execution of the program at the breakpoint if the deciding is false, and
allowing the program to continue to execute if the deciding is true.

17. The electronic device of claim 16, wherein the selecting further comprises:
finding the one of the plurality of values that is associated with a time that the breakpoint was encountered, wherein the condition specifies the time.

18. The electronic device of claim 16, wherein the deciding further comprises:
deciding whether to allow the program to continue executing based on the thread and a user interface selection.

19. The electronic device of claim 16, wherein the instructions further comprise:
presenting a user interface that allows specification of exclusion and inclusion of the breakpoint on a thread basis.

20. The electronic device of claim 16, wherein the deciding further comprises:
evaluating the condition.

* * * * *